United States Patent
O'Herlihy et al.

(10) Patent No.: US 11,308,439 B2
(45) Date of Patent: Apr. 19, 2022

(54) GOODS RECEIPT MANAGEMENT SYSTEM AND METHOD

(71) Applicant: Everseen Limited, Blackpool (IE)

(72) Inventors: Alan O'Herlihy, Glenville (IE); Sergiu Alexandru Vlad, Timisoara (RO); Viorel Baicu, Timisoara (RO)

(73) Assignee: Everseen Limited, Blackpool (IE)

(*) Notice: Subject to any disclaimer, the term of this patent is extended or adjusted under 35 U.S.C. 154(b) by 75 days.

(21) Appl. No.: 17/068,139

(22) Filed: Oct. 12, 2020

(65) Prior Publication Data
US 2021/0027240 A1 Jan. 28, 2021

Related U.S. Application Data

(63) Continuation-in-part of application No. 16/254,154, filed on Jan. 22, 2019, now Pat. No. 10,913,605.

(51) Int. Cl.
*G06K 9/00* (2022.01)
*G06Q 10/08* (2012.01)
(Continued)

(52) U.S. Cl.
CPC ... *G06Q 10/0832* (2013.01); *G06F 16/90332* (2019.01); *G06F 21/32* (2013.01);
(Continued)

(58) Field of Classification Search
CPC .. G06Q 10/0832; G06Q 10/087; G06Q 50/28; G06F 16/90332; G06F 21/32;
(Continued)

(56) References Cited

U.S. PATENT DOCUMENTS

| 7,735,732 B2 | 6/2010 | Linton et al. |
| 7,780,081 B1 | 8/2010 | Liang |

(Continued)

FOREIGN PATENT DOCUMENTS

| JP | 5866559 B2 | 2/2016 |
| RU | 2639015 C1 | 12/2017 |

(Continued)

OTHER PUBLICATIONS

"Retail Grocery Store Logistics and Inventory Management" by Jim Davis et al. http://www.s2ct.tech/whitepaper-grocery-inventory-management.

(Continued)

*Primary Examiner* — Charlotte M Baker
(74) *Attorney, Agent, or Firm* — Young Basile Hanlon & MacFarlane, P.C.

(57) ABSTRACT

A goods receipt management system includes processors coupled to a non-transitory storage device and operable to execute routines that include a face recognition engine to use facial features of a user to recognize the user as an authorised person, a dialogue manager engine to obtain from the authorised person a stated number of goods items being delivered, a quantification engine to receive an image of the goods items and calculate the number of goods items appearing in the image, a comparison engine to compare the calculated number of goods items with the stated number of goods items, and in the event of a substantial match, to record the calculated number of goods items, and a performance improvement engine to use the image of the goods items to re-tune configuration variables, in the event of a mis-match between calculated number of goods items and stated number of goods items.

20 Claims, 8 Drawing Sheets

(51) Int. Cl.
*G06F 16/9032* (2019.01)
*G06N 3/04* (2006.01)
*G06K 9/62* (2022.01)
*G06F 21/32* (2013.01)
*G06V 20/20* (2022.01)
*G06V 40/16* (2022.01)

(52) U.S. Cl.
CPC ........... *G06K 9/6223* (2013.01); *G06N 3/049* (2013.01); *G06N 3/0454* (2013.01); *G06V 20/20* (2022.01); *G06V 40/172* (2022.01)

(58) Field of Classification Search
CPC .. G06K 9/6223; G06K 9/6262; G06N 3/0454; G06N 3/049; G06N 3/0445; G06N 20/00; G06N 3/08; G06V 20/20; G06V 40/172; G06V 10/82; G06V 20/52
USPC ................... 382/103, 159, 115; 705/330, 41; 707/E17.023, E17.024, E11.207
See application file for complete search history.

(56) References Cited

U.S. PATENT DOCUMENTS

| | | | |
|---|---|---|---|
| 9,996,818 | B1 | 6/2018 | Ren et al. |
| 2004/0249497 | A1 | 12/2004 | Saigh et al. |
| 2006/0239545 | A1* | 10/2006 | Tedesco ............. G06F 16/5838 707/E17.023 |
| 2007/0198848 | A1 | 8/2007 | Bjorn |
| 2009/0164631 | A1 | 6/2009 | Wooley |
| 2014/0195424 | A1* | 7/2014 | Zheng ................. G06Q 20/351 705/41 |
| 2014/0351163 | A1* | 11/2014 | Tussy .................. G06Q 10/083 705/330 |
| 2018/0285810 | A1 | 10/2018 | Ramachandran et al. |
| 2019/0037012 | A1 | 1/2019 | Stocker |
| 2019/0043615 | A1 | 2/2019 | Subbarao et al. |
| 2019/0122173 | A1 | 4/2019 | Souder et al. |
| 2019/0213212 | A1 | 7/2019 | Adato et al. |
| 2020/0005385 | A1 | 1/2020 | Stout et al. |
| 2020/0121533 | A1* | 4/2020 | Will, IV ............ G07C 9/00571 |
| 2020/0231382 | A1 | 7/2020 | O'Herlihy et al. |
| 2021/0279475 | A1* | 9/2021 | Tusch ................. H04L 63/0861 |

FOREIGN PATENT DOCUMENTS

| | | |
|---|---|---|
| WO | 2018037148 A1 | 3/2018 |
| WO | 2018063167 A1 | 4/2018 |
| WO | 2019152750 A1 | 8/2019 |
| WO | 2020152569 A2 | 7/2020 |

OTHER PUBLICATIONS

Saveen A. Abeyratne . et al: 11 Blockchain Ready Manufacturing Supply Chain Using Distributed Ledger 11 , IJRET : International Journal of Research in Engineering and Technology, vol. 05, No. 09, Sep. 25, 2016 (Sep. 25, 2016), pp. 1-10, XP055541754, Bangalore, India ISSN: 2321-7308, DOI: 10.15623/ijret.2016.0509001 pp. 7,9.
Melanie Swan: "Blockchain: Blueprint for a New Economy" In: 11 Blockchain: Blueprint for a New Economy 11 , Feb. 8, 2015 (Feb. 8, 2015), O'Reilly, XP055279098, ISBN: 978-1-4919-2049-7 pp. 37,48.
Stephen Mckeon: 11 What is a blockchain token? 11, Aug. 29, 2018 (Aug. 29, 2018), XP055704371, Retrieved from the Internet: URL:https://web.archive.org/web/20180829024901/https://theconversation.com/what-is-a-blockchain-token-98916 [retrieved on Jun. 12, 2020] p. 1.

* cited by examiner

GOODS RECEIPT MANAGEMENT SYSTEM AND METHOD

CROSS REFERENCE TO RELATED APPLICATION

This application is a continuation-in-part of U.S. patent application Ser. No. 16/254,154, filed on Jan. 22, 2019, the entire content of which is incorporated by reference herein.

TECHNICAL FIELD

The present disclosure relates to goods receipt management system and method, and more particularly to systems and methods for automated management of the receipt of goods items in a warehouse.

BACKGROUND

A warehouse may store very large quantities of goods items for subsequent distribution. Thus, monitoring of stock levels is an important aspect of warehouse management. Current automated warehouse management systems typically use unique bar codes imprinted on individual stock items or on their container(s) to keep track of massive numbers of goods items. In use, bar codes are read by laser beam scanners interfaced with a computer system to interpret the scanned bar code pattern; and update warehouse stock records accordingly. However, the process of reading individual bar codes of thousands/tens of thousands of goods items can be extremely time-consuming. Similarly, the integrity of the resulting stock data is limited by human errors made by the warehouse operator(s). Other warehouse management methods may involve manual counting of individual goods items and the manual entry of the resulting count data into a computerized goods receipt management system. However, this is a laborious and time-consuming task, wherein errors made during counting and data entry limit the integrity of the resulting stock data.

In today's retail environment, sales of a given product may exceed 10-20 million units (also known as goods items) annually. These goods items may be expensive and may spend extended periods in a dealer's store before being bought. Thus, the dealers may require financing for these goods items from suppliers. To protect their investment, suppliers and/or warehouse owners must keep a close eye on stocks of goods items.

In a warehouse, each goods item must be identified and tracked from the manufacturer to the distributer and the dealer network until the point of sale. While each goods item is provided by the manufacturer with a unique serial number to permit its subsequent identification, the process of inspecting individual serial numbers of vast numbers of goods items is labor-intensive and time-consuming.

Further, stock control in a dealer location is particularly difficult because the cost of floor check fees (determined by the number of goods items to be counted) makes it prohibitively expensive to count goods items more than once a month. The paucity of up-to-date information regarding numbers of goods items at various stages in a supply chain means that there is little effective correlation between sales, production, shipping, warehousing and the like. Hence, problems of left-over models, stock being in the wrong warehouse and the like, severely impact a supply chain system.

A key stage in the management of a warehouse, and supply chain management more generally, is the checking of goods items received into a warehouse or dealer location, by way of deliveries or returned goods items. Thus, there is a clear need for a system which eliminates or reduces the problem of cost-effectively managing the receipt of goods items, and more particularly, checking the number of goods items received at a location.

SUMMARY

This summary is provided to introduce concepts related to a goods receipt management system and method in a warehouse. The concepts are further described below in the detailed description. This summary is not intended to identify key features or essential features of the claimed subject matter, nor is it intended to be used to limit the scope of the claimed subject matter.

According to a first aspect of the invention, there is provided a goods receipt management system that includes a non-transitory storage device having embodied therein one or more routines to manage the receipt of goods items at a location, and one or more processors coupled to the non-transitory storage device and operable to execute the one or more routines. The one or more routines include a face recognition engine, which when executed by the one or more processors, uses one or more facial features of a user to recognize the user as an authorised person. The one or more routines may further include a dialogue manager engine, which when executed by the one or more processors, obtains from the authorised person a stated number of goods items being delivered. The one or more routines may further include a quantification engine, which when executed by the one or more processors, receives an image of the goods items and calculates the number of goods items appearing in the image. The one or more routines may further include a comparison engine, which when executed by the one or more processors, compares the calculated number of goods items with the stated number of goods items, and in the event of a substantial match, records the calculated number of goods item. The one or more routines may further include a performance improvement engine, which when executed by the one or more processors, uses the image of the goods items to re-tune one or more configuration variables of the quantification engine, in the event of a mis-match between the calculated number of goods items and the stated number of goods items.

According to a second aspect of the invention, there is provided a method for managing the receipt of goods at a location. The method includes recognizing a user as an authorised person using one or more facial features of the user. The method may further include obtaining from the authorised person a stated number of goods items being delivered. The method may further include receiving an image of the goods items. The method may further include calculating the number of goods items appearing in the image. The method may further include comparing the calculated number of goods items with the stated number of goods items. The method may further include recording the calculated number of goods item in the event of a substantial match between the calculated number of goods items and the stated number of goods items. The method may further include re-tuning one or more configuration variables of the method using the image of the goods items, in the event of a mis-match between the calculated number of goods items and the stated number of goods items.

According to a third aspect of the invention there is provided a non-transitory computer readable medium configured to store a program causing a computer to manage the receipt of goods at a location. The program is configured to recognize a user as an authorised person using one or more facial features of the user, obtain from the authorised person a stated number of goods items being delivered, receive an image of the goods items, calculate the number of goods items appearing in the image, compare the calculated number of goods items with the stated number of goods items, record the calculated number of goods item in the event of a substantial match between the calculated number of goods items and the stated number of goods items, and re-tune one or more configuration variables using the image of the goods items, in the event of a mis-match between the calculated number of goods items and the stated number of goods items.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

A few aspects of the present disclosure are explained in detail below with reference to the various figures. Example implementations are described to illustrate the disclosed subject matter, not to limit its scope, which is defined by the claims. Those of ordinary skill in the art will recognize several equivalent variations of the various features provided in the description that follows.

The primary aim of the present disclosure is to provide an automated system for managing the receipt of goods items into a location, to ease subsequent sorting, marking, tracking of the goods items therein. The present disclosure proposes methods and systems for providing complete automated and voice-based interactions with users of the systems. Various embodiments are further described herein with reference to the accompanying figures. It should be noted that the description and figures relate to exemplary embodiments and should not be construed as a limitation to the subject matter of the present disclosure. It is also to be understood that various arrangements may be devised that, although not explicitly described or shown herein, embody the principles of the subject matter of the present disclosure. Moreover, all statements herein reciting principles, aspects, and embodiments of the subject matter of the present disclosure, as well as specific examples, are intended to encompass equivalents thereof. Yet further, for the sake of brevity, operation or working principles pertaining to the technical material that is known in the technical field of the present disclosure have not been described in detail so as not to unnecessarily obscure the present disclosure.

Figure 1:
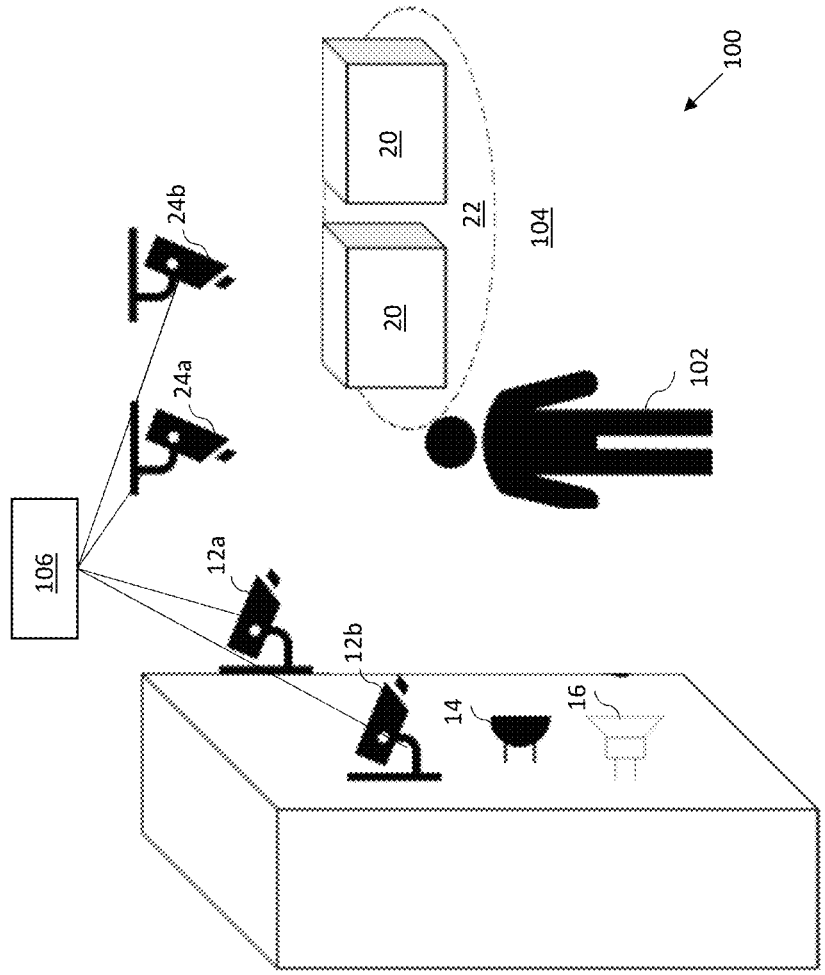
FIG. 1 illustrates an exemplary first environment, wherein various embodiments of the present disclosure can be practiced.

Referring to FIG. 1, an exemplary first environment 100 is disclosed, wherein various embodiments of the present invention can be practiced. The first environment 100 includes a user 102 in a goods receiving area 104 of a warehouse or a dealer location, a first set of cameras 12a and 12b (hereinafter referred to as first video cameras 12), a microphone 14, a speaker 16, and a second set of cameras 24a and 24b (hereinafter referred to as second video cameras 24). The user 102 may be a delivery person, truck driver or the like, delivering one or more containers (for example pallets of boxes) of goods items (or returned goods items) to the goods receiving area 104. The user 102 may be an authorised user who has been previously authorised (for example, by the location operators) to deliver goods items to the goods receiving area 104.

The first video cameras 12 are installed at a first position of the goods receiving area 104. Each of the first video cameras 12 may capture video footage of a region of the goods receiving area 104. The said region may be within the field of view of the first video cameras 12. The microphone 14 and speaker 16 may be located proximally to the first video cameras 12. The second video cameras 24 may be placed a little farther from the first video cameras 12. In an embodiment of the present disclosure, the first and second video cameras 12 and 18, the microphone 14, and the speaker 16 are controlled and managed by a goods receipt management system 106.

In accordance with an embodiment of the present disclosure, the goods receipt management system 106 is configured to enable the speaker 16 to direct the user 102 to approach the first video cameras 12 when the user 102 enters the goods receiving area 104, so that an image of the user 102 may be extracted from the video footage captured by the first video cameras 12.

The goods receipt management system 106 is further configured to analyze the images captured by the first video cameras 12, and identify the user 102 as an authorised person or otherwise. In the event, the user 102 is identified as an authorised person, the goods receipt management system 106 may use the microphone 14 and the speaker 16 to obtain further information from the user 102 and to direct the user 102 to place the goods items 20 in a designated zone 22 of the goods receiving area 104.

In the context of the present disclosure, the designated zone 22 may be shown by painting the outline of a shape of the designated zone 22 on the floor of the goods receiving area 104. Alternatively, the designated zone 22 may be shown by projecting an outline of a shape of the designated zone 22 on the floor of the goods receiving area 104 by an overhead projector (not shown). The skilled person will understand that the preferred embodiment is not limited to these mechanisms of showing the designated zone 22 to the user 102. Instead, the preferred embodiment is operable with any suitable mechanism of showing the user 102, the location and dimensions of the designated zone 22.

In an embodiment of the present disclosure, the second video cameras 24 may be installed proximally to the designated zone 22, wherein the second video cameras 24 are adapted to capture video footage of the goods items 20 placed in the designated zone 22.

While FIG. 1 shows the microphone 14 and the speaker 16 as separate components, the skilled person will understand that the preferred embodiment is not limited to this arrangement. Instead, the preferred embodiment is operable with any arrangement of the speaker and the microphone, including an integral arrangement thereof. Similarly, while FIG. 1 shows the first video cameras 12 as being separate to the second video cameras 24, the skilled person will understand that the preferred embodiment is not limited to this arrangement. Instead, the first video cameras 12 and the second video cameras 24 may be integrated together to capture video footage of the designated zone 22 and an image of the face of the user 102.

Figure 2:
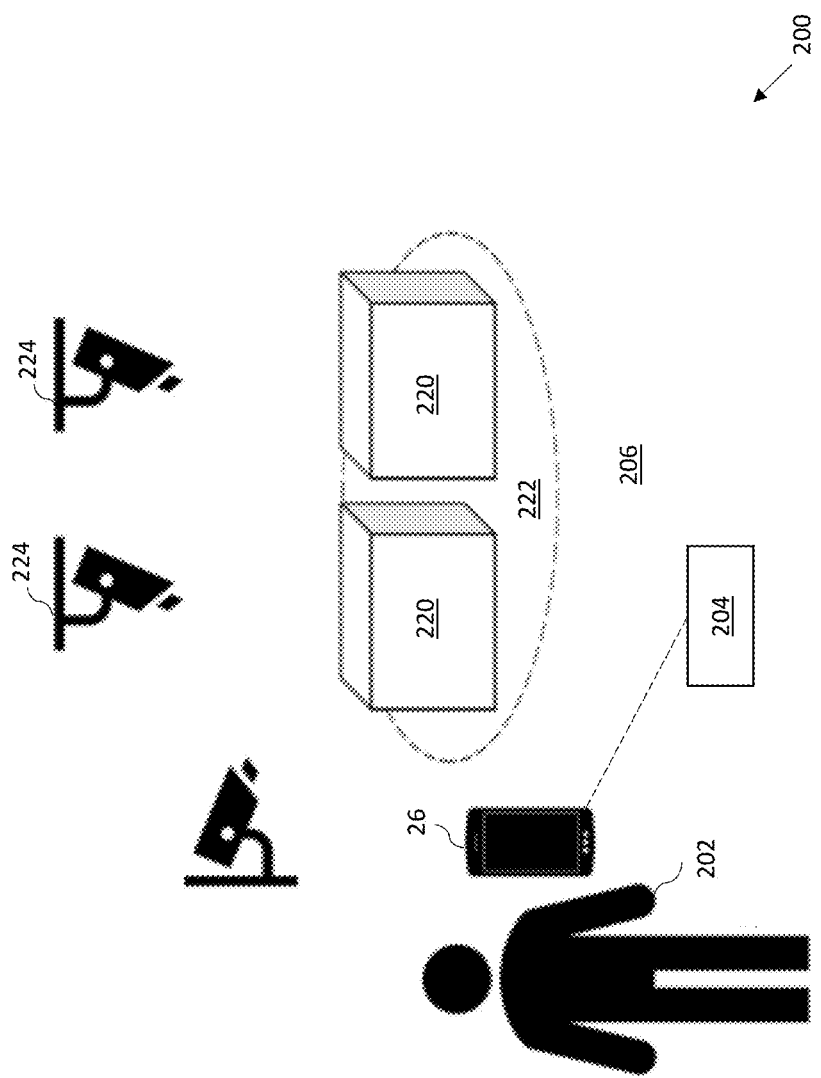
FIG. 2 illustrates an exemplary second environment, wherein various embodiments of the present disclosure can be practiced.

FIG. 2 illustrates an exemplary second environment 200, wherein various embodiments of the present disclosure can be practiced.

The second environment 200 includes a user 202, a smart phone 26 in the possession of the user 202 and a goods receipt management system 204 communicatively coupled to the smart phone 26, so that the goods receipt management system 204 may be adapted to receive and transmit data to and from the video camera(s), the microphone, and the speaker of the smart phone 26 to respectively identify and communicate with the user 202. The goods receipt management system 204 may communicate with the smart phone 26 through a wired or a wireless network. In the second environment 200, as the user 202 approaches a receiving area 206 of the warehouse, the goods receipt management system 204 may be adapted to request the user 202 to capture a self portrait ("selfie") of themselves using the camera of the smart phone 26 and to transmit the selfie to the goods receipt management system 204. The goods receipt management system 204 may be adapted to receive the selfie and identify the user 202 as being an authorised person or otherwise.

In the event the user 202 is identified as an authorised person, the goods receipt management system 204 may be adapted to use the microphone, and the speaker of the smart phone 26 to obtain further information from the user 202 and to direct the user 202 to place the goods items 220 in a designated zone 222 of the goods receiving area 206. The second environment 200 may further include one or more second video cameras 224 installed proximally to the designated zone 222, wherein the second video cameras 224 may be adapted to capture video footage of the goods items 220 placed in the designated zone 222.

In an aspect, the goods receipt management system 204 may be implemented as a cloud-based system and can be accessed by devices connected to the goods receipt management system though a communication network. The communication network may be a single network or a combination of multiple networks. The communication network may include one or more area networks, such as a local area network (LAN), a wide area network (WAN), an intranet, the internet, or any other type of network. In an example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

Figure 3:
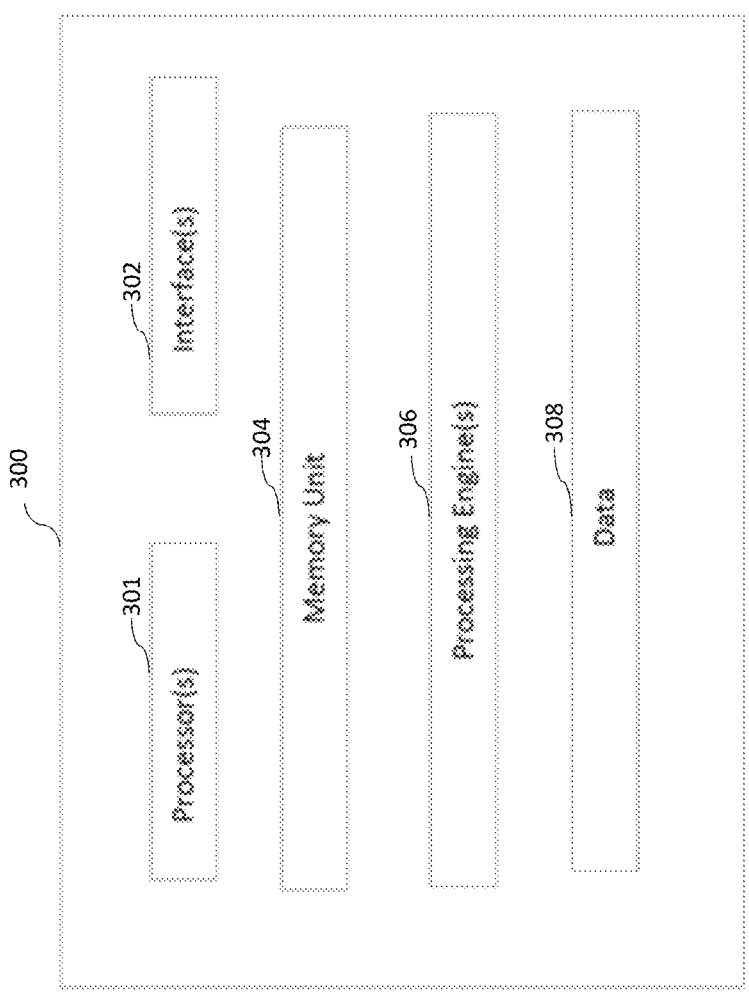
FIG. 3 is a block diagram illustrating a goods receipt management system of FIGS. 1 and 2 in detail, in accordance with an embodiment of the present disclosure.

FIG. 3 is a block diagram illustrating a goods receipt management system 300 (similar to the goods receipt management system 106 and 204), in accordance with an embodiment of the present disclosure. The goods receipt management system 300 includes one or more processors 301, one or more interfaces 302, and a memory unit 304. Each processor 301 may be implemented as one or more microprocessors, microcomputers, microcontrollers, digital signal processors, logic circuitries, and/or any devices that manipulate data based on operational instructions. Among other capabilities, each processor 301 is configured to fetch and execute computer-readable instructions and one or more routines stored in the memory unit 304. The memory unit 304 may store one or more computer-readable instructions or routines, which may be fetched and executed to manage goods receipt over a network service. The memory unit 304 may include any non-transitory storage device including, for example, volatile memory such as RAM, or non-volatile memory such as EPROM, flash memory, and the like.

The interface 302 may include a variety of interfaces, for example, interfaces for data input and output devices referred to as I/O devices, storage devices, and the like. The interface 302 may facilitate communication of the goods receipt management system 300 with various devices coupled thereto. The interface 302 may also provide a communication pathway for one or more components of the goods receipt management system 300. Examples of such components include, but are not limited to, one or more processing engines 306 and data 308. The data 308 may include data that is either stored or generated as a result of functionalities implemented by any of the components of the processing engine 306.

The processing engine 306 may be implemented as a combination of hardware and programming (for example, programmable instructions) to implement one or more functionalities of each processing engine 306. In examples described herein, such combinations of hardware and programming may be implemented in several different ways. For example, the programming for each processing engine 306 may be processor executable instructions stored on a non-transitory machine-readable storage medium and the hardware for each processing engine 306 may include a processing resource (for example, one or more processors), to execute such instructions. In the present examples, the machine-readable storage medium may store instructions that, when executed by the processing resource, implement the processing engine 306. In such examples, the goods receipt management system 300 may include the machine-readable storage medium storing the instructions and the processing resource to execute the instructions; or the machine-readable storage medium may be separate but accessible to the goods receipt management system and the processing resource. In other examples, the processing engine 306 may be implemented by electronic circuitry.

Figure 4:
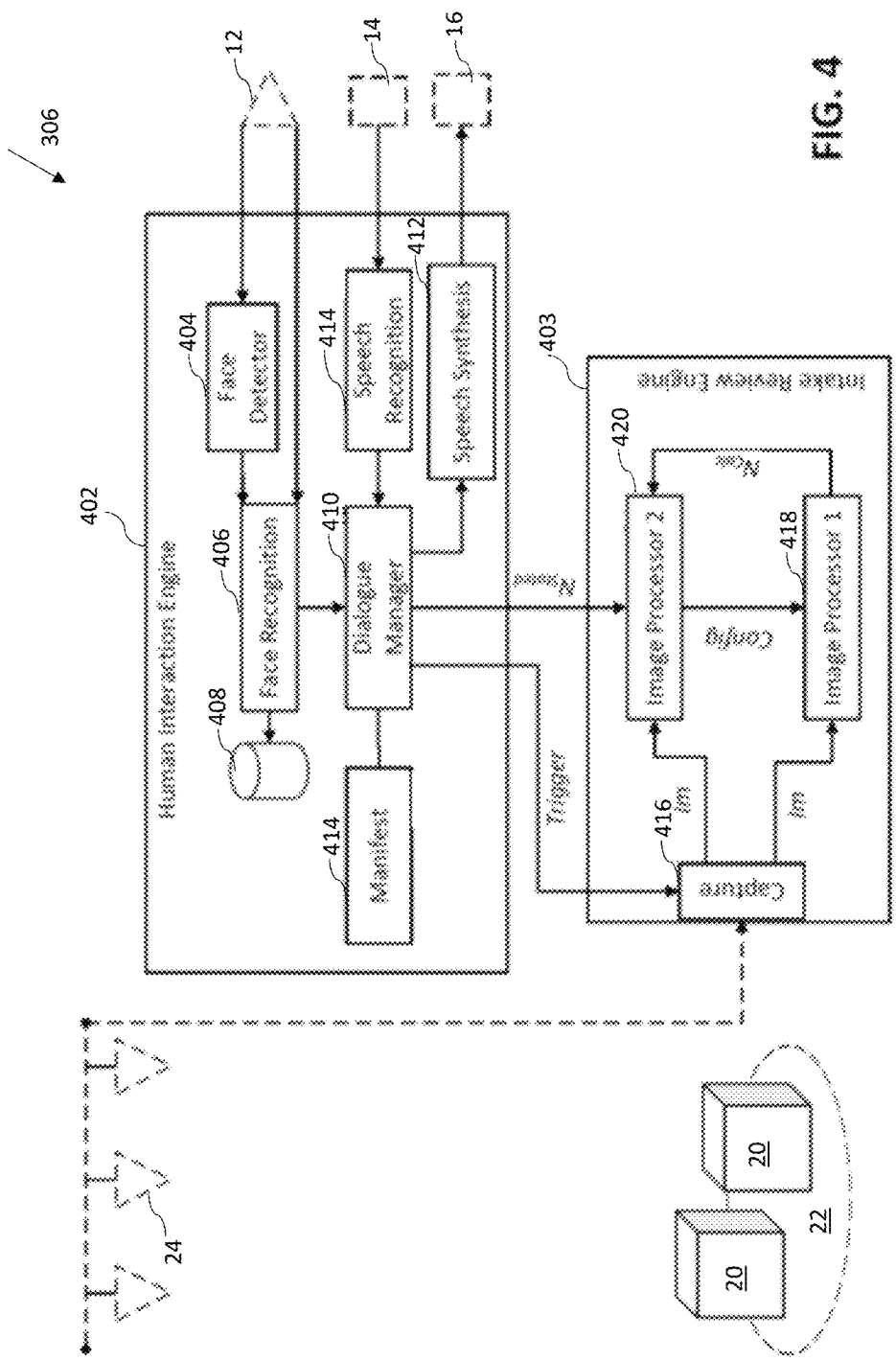
FIG. 4 is a block diagram illustrating a detailed view of a processing engine of the goods receipt management system of FIG. 3 in accordance with an embodiment of the present disclosure.

FIG. 4 is a block diagram illustrating the processing engine 306 in detail, in accordance with an embodiment of the present disclosure. The processing engine 306 includes a human interaction engine 402 and an intake review engine 403. The human interaction engine 402 may be adapted to monitor and regulate interactions between the goods receipt management system and human users (not shown) thereof. The intake review engine 403 may be adapted to monitor and assess goods items received into corresponding goods receiving area of the location.

Specifically, the human interaction engine 402 may comprise a face detector engine 404 communicatively coupled with the first video camera 12 to receive video footage therefrom. The face detector engine 404 may employ a face detection algorithm to detect the presence of a human face in one or more video frames from the received video footage. The face detection algorithms may include one or more of the Viola-Jones face detector, Speeded Up Robust Features (SURF) cascades, Support Vector Machines (SVM) and Convolutional Neural Networks. The skilled person will recognize that the above algorithms are provided as examples only; and that goods receipt management system of the preferred embodiment is not limited to these algorithms. Instead, the goods receipt management system 300 of FIG. 3 is operable with any algorithm suitable for detecting the presence of a human face in one or more video frames.

On detection of a human face in one or more video frames from the received video footage, the face detector engine 404 may produce an output comprising a bounding box (not shown) positioned to enclose the human face and thereby provide co-ordinates for the location of the human face in each relevant video frame. The bounding box output may also alert the human interaction engine 402 that a human has been detected proximal to the receiving area of the location.

The human interaction engine 402 further includes a face recognition engine 406 communicatively coupled with the face detector engine 404, an authorised persons database 408 and/or the first video camera 12. The authorised persons database 408 may include a pre-populated record comprising details of one or more authorised persons. These details may include facial details of each authorised person. For brevity, these facial details will be referred to henceforth to as the one or more stored facial records.

The authorised persons database 408 may also include name details of the or each authorised person, name details of the employer of each authorised person, access rights of each authorised person indicating those areas of the location to which each authorised person is allowed entry, and details of previous date/times at which each authorised person visited the location (possibly including video footage of those previous visits).

The skilled person will understand that the above details are provided for example purposes only, and that the preferred embodiment is in no way limited to the inclusion of these details in the authorised persons database 408.

The face recognition engine 406 may be adapted to receive a bounding box from the face detector engine 404 and use this to pre-process each video frame containing the detected human face (for example, to centre the face in the or each video frame). The face recognition engine 406 may comprise a face recognition algorithm which may be adapted to compute facial details of the face detected in each video frame. For brevity, these facial details will be referred to henceforth as the requestor facial details.

The facial recognition algorithms employed by the face recognition engine 406 may include Support Vector Machines, Principal Component Analysis/Kernel Principal Component Analysis, Independent Component Analysis, Hidden Markov Models, Convolutional Neural Networks or Generative Adversarial Networks. The person skilled in the art will understand that the above face recognition algorithms are provided for example purposes only. In particular, the goods receipt management system of the preferred embodiment is in no way limited to these face recognition algorithms. Instead, the goods receipt management system of the preferred embodiment is operable with any face recognition algorithm which supports the recognition of a face detected in one or more video frames.

The face recognition engine 406 may be further adapted to interrogate the authorised persons database 408 and to use each face recognition algorithm to compare the requestor facial details against each stored facial record in the authorised persons database 408. In the event, the face recognition engine 406 finds a close match between the requestor facial details and a stored facial record, the user (not shown) may be deemed to be the authorised person corresponding with the closest matching stored facial record.

On detection of a match, the face recognition engine 406 may be adapted to retrieve from the authorised persons database 408, the details of corresponding authorised person. For brevity, these retrieved details will be referred to henceforth as the matching person details. The face recognition engine 406 may also be adapted to transmit each matching person detail to a dialogue manager 410 of the human interaction engine 402. In the event, the face recognition engine 406 fails to find a match between the requestor facial detail and at least one of the stored facial records, the face recognition engine 406 may also be adapted to transmit a "No-Match" message to the dialogue manager 410.

The dialogue manager 410 may include one or more dialogue rules which may be pre-configured by the location operators. Each dialogue rule may comprise one or more narrative components and one or more logical components. These collectively define a framework for a choreographed bidirectional exchange of information between the authorised person and the goods receipt management system to guide the authorised person on a required protocol for delivering goods items to the location.

The dialogue manager 410 may be communicatively coupled with the face recognition engine 406 to receive therefrom the matching person. details. The dialogue manager 410 may be adapted to customise a dialogue by including any of the received matching person details into the or each narrative components of the dialogue framework. Specifically, the narrative components of the dialogue framework may comprise natural language textual elements, symbolic linguistic representations or a phonetic transcription thereof into which the name of the authorised person and/or their employer may be inserted. The logical components of the dialogue framework may include conditional logic units which may be pre-configured by the location operators. For example, the logical components may be operable to use any of the details of the matching person or information received from the authorised person to customize one or more narrative components of the dialogue framework and/or to deliver one or more narrative components from the dialogue framework to the authorised person.

The dialogue manager 410 may be communicatively coupled with a speech synthesis engine 412 and a speech recognition engine 414 to conduct a dialogue with the authorised person in accordance with the customized narrative components and the logical components of the dialogue framework. Specifically, the speech synthesis engine 412 may be adapted to receive the narrative components of the dialogue framework from the dialogue manager 410 and to convert the narrative components into speech. To this end, the speech synthesis engine 412 may employ concatentive or parametric speech synthesis algorithms, or may employ audio generative models based on Convolutional Neural Networks and/or Recurrent Neural Networks such as WaveNet, VoiceLoop and Tacotron. The skilled person will understand that these algorithms and audio generative models are provided as examples only. In particular, the skilled person will understand that the goods receipt management system of the preferred embodiment is not limited with these algorithms and audio generative models. Instead, the goods receipt management system of the preferred embodiment is operable with any speech synthesis algorithm capable of converting narrative components into speech. The speech synthesis engine 412 outputs the speech to the authorised person through the speaker 16.

The bidirectional exchange of information in the dialogue framework, requires the dialogue manager 410 to receive information from the authorised person. To this end, the speech output to the authorised person may be designed to include prompts for information from the authorised person. More specifically, the speech output may include prompts in the form of questions to the authorised person. The speech output may also include direction to the authorised person to provide answers to the questions by speaking into the microphone 14. The microphone 14 may be adapted to detect and receive utterances from the authorised person and to transmit the utterances to the speech recognition engine 414.

The speech recognition engine 414 may be adapted to receive the utterances from the microphone 14 and to use one or more automatic speech recognition algorithms to convert the utterances into text or other signals or coding elements or patterns that are understandable by the dialogue manager 410. The automatic speech recognition algorithms may include Gaussian Mixture Model based Hidden Markov Models (GMM-HMM), K-Means Clustering, Expectation Maximisation (EM), Kernel Principal Component Analysis, Deep Belief Neural Networks (DBN), Recurrent Neural Network or Time Delay Neural Network (TDNN). The skilled person will recognize that these algorithms are provided as examples only. In particular, the skilled person will understand that the goods receipt management system of the preferred embodiment is not limited to the abovementioned automatic speech recognition algorithms. Instead, the goods receipt management system of the preferred embodiment is operable with any automatic speech recognition algorithm which is capable of converting received utterances from the authorised person into one or more textual elements or coding elements or patterns that are understandable by the dialogue manager 410. The speech recognition engine 414 may also be adapted to transmit the resulting the text, other signals or coding elements or patterns to the dialogue manager 410.

On receipt of the text, other signals or coding elements or patterns from the speech recognition engine 414, the dialogue manager 410 may be adapted to execute the logical components of the dialogue framework to customize narrative components of the dialogue framework and/or to deliver further narrative components from the dialogue framework to the authorised person.

The dialogue manager 410 may further be communicatively coupled with a manifest unit 414. The manifest unit 414 may include details of deliveries to the location expected on a given day. The details may include any of the supplier name, the delivery person, the identity of the or each goods items to be delivered and the number of said goods items. The skilled person will understand that these details are provided as examples only. In particular, the skilled person will understand that the preferred embodiment is not limited to the inclusion of the above details. Instead, the preferred embodiment is operable with any record which provides a facility for cross-checking and validating a delivery to the location.

Figure 5:
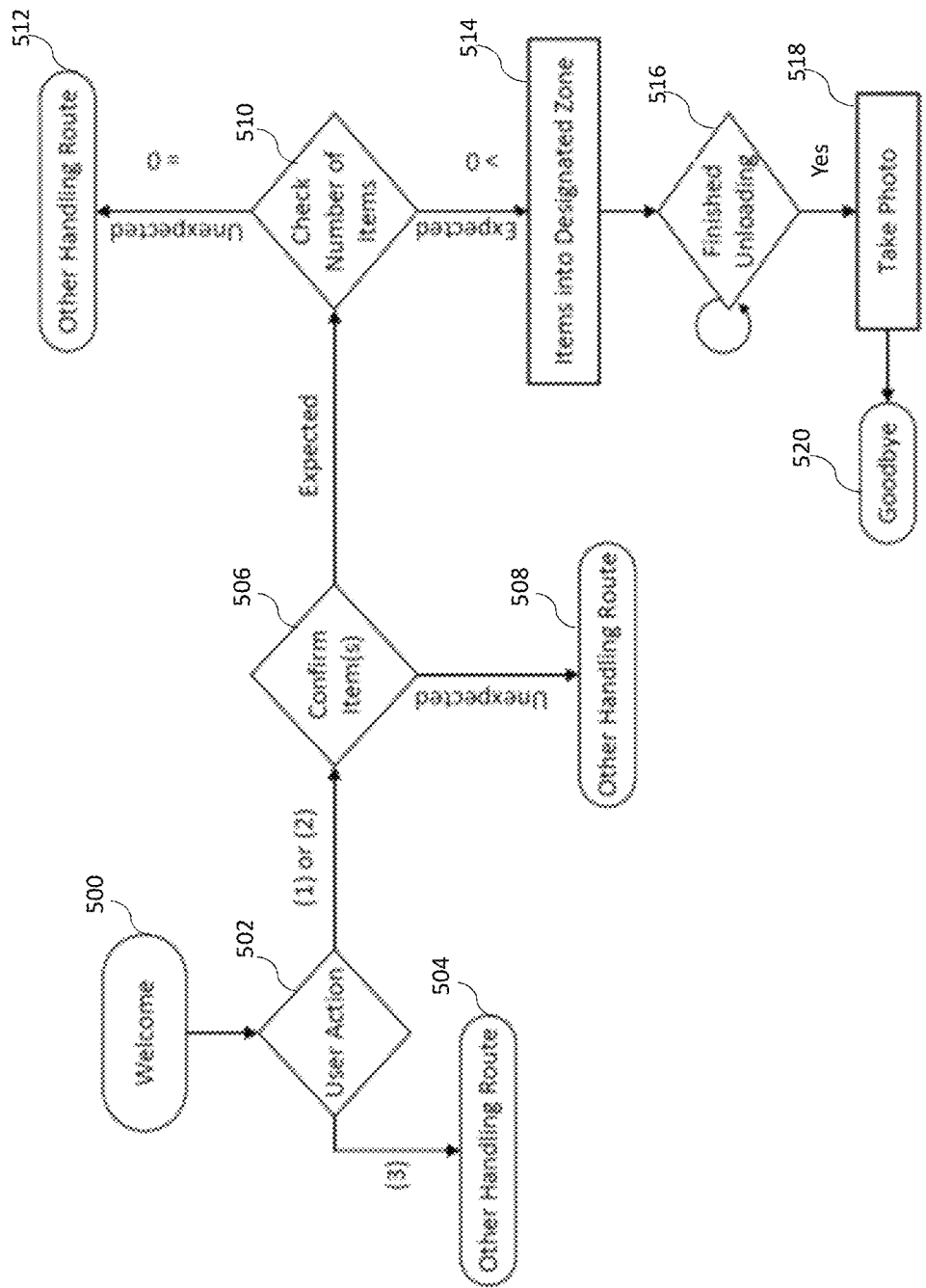
FIG. 5 illustrates an exemplary dialogue implemented by a dialogue manager of the processing engine of FIG. 4 in accordance with an embodiment of the present disclosure.

FIG. 5 is a flowchart illustrating an exemplary dialogue of the dialogue manager 410 with an authorised person, in accordance with an embodiment of the present disclosure. The dialogue manager 410 uses the narrative components and the logical components of the dialogue framework, along with the speech synthesis engine 412, and the speech recognition engine 414 to execute the following exemplary dialogue with the authorised person:

At step 500 a narrative component welcomes the authorised person.
"Welcome [NAME] From [Company]"
At step 502 a logical component asks the authorised person what action they want to perform.
"Are you (1) delivering goods items today; or (2) returning goods items today or (3) other?"
At step 504 a narrative component requests the authorised person to follow an alternative route in the event the authorised person selected option 3 in response to step 502.
"Please go to reception"
At step 506 a logical component requests the authorised person to confirm the items they are delivering to the location, in the event the authorised person selected option (1) or (2) in response to step 502.
"What item(s) are your delivering today?"
At step 508 a narrative component requests the authorised person to follow an alternative route in the event the authorised person's response to step 506 does not match with details contained in the manifest unit 414.
"Please go to reception"
At step 510 a logical component requests the authorised person to confirm the number of items they are delivering to the location, in the event the authorised person's response to step 506 matches with details contained in the manifest unit 414.
"How many goods items are you delivering/returning today?"
At step 512 a narrative component requests the authorised person to follow an alternative route in the event the number of items stated by the user in response to step 510 is zero.
"Please go to reception"
At step 514 a narrative component requests the authorised person to put into a designated zone the goods items being delivered to the location in the event the number of items stated by the user in response to step 510 is greater than zero.
"Please put the pallet with the goods into the shown designated receiving zone."
At step 516 a logical component requests the authorised person to confirm that they have finished putting the goods items into the designated zone.
"Have you finished unloading?"
At step 518 a narrative component advises the authorised person that a snapshot picture of the designated zone (and the goods items loaded therein) when the authorised person's response to step 516 is 'yes'
"Please wait while we take a picture of the pallet
At step 520 a narrative component closes the dialogue by issuing a closing pleasantry.
"Thanks very much. Goodbye"
Step 516 is repeated when the authorised person's response thereto is 'no'.
"Have you finished unloading?"

The skilled person will understand that the above dialogue is provided as an example only. In particular, the skilled person will understand that the preferred embodiment is in no way limited to the above dialogue. Instead, the preferred embodiment is operable with any dialogue or dialogue framework which may be configurable by the location operators, which includes information from the manifest unit 414 to support further automatic checking and validation of the incoming delivery.

Referring back to FIG. 4, the dialogue manager 410 may further be adapted to receive a "No-Match" message from the face recognition engine 406. The dialogue manager 410 may further be adapted 406 to issue a dialogue framework to the speech synthesis engine 412 on receipt of a "No-Match" message from the face recognition engine 406. The narrative components of the issued dialogue framework may include a message stating, for example, that the location is a restricted access property and directing the detected person to a reception area for further assistance. The person skilled in the art will understand that the above narrative component is provided as an example only and that the preferred embodiment is not in any way limited to this narrative component. On the contrary, the preferred embodiment is operable with any narrative component in response to the "No Match" message which may be configurable by the location operators.

On receipt (for example, in response to step 516 in FIG. 5) of an indication that the authorised person has finished putting each goods item 20 in the designated zone 22, the dialogue manager 410 may issue a triggering signal (Trigger) to a capture engine 416 of the intake review engine 403. On receipt of the triggering signal (Trigger), the capture engine 416 may be adapted to receive from the second video cameras 24 one or more video frames of the designated zone 22 and the goods item(s) 20 put therein. The capture engine 416 may be communicatively coupled with first and second image processing engines 418 and 420 to transmit thereto the video frames (Im) received from the second video cameras 24.

The dialogue manager 410 may also be adapted to transmit to the second image processing engine 420, the received statement (for example, in response to step 510 in FIG. 5) from the authorised person regarding the number ($N_{stated}$) of goods items being delivered to the location. In a further embodiment, the dialogue manager 410 may also be adapted to transmit to the second image processing engine 420, information from the manifest unit 414 regarding the expected number of goods items to be delivered to the location by the relevant supplier that corresponding day.

The first and second image processing engines 418 and 420 may include a plurality of algorithms employing a plurality of models. The operational performance of at least some of the algorithms may be at least partly determined by a plurality of tunable parameters, hyperparameters or other aspects of each model or algorithm or both. For brevity, the tunable parameters, hyperparameters or other aspects of each model or each algorithm or both will be referred to henceforth as configuration variables. One or more values of the configuration variables may be previously initialised using a training set. The training set may comprise a plurality of video frames from the second video cameras 24 (or from other video cameras arranged in a similar manner), wherein the video frames may include different numbers of different types of goods items placed in different arrangements in the designated zone 22 (or other comparable area). The training set may also include corresponding details of the number and types of goods items appearing in substantially each video frame.

The first and second image processing engines 418 and 420 may be arranged in a feedback loop which may be adapted to provide real-time, ongoing, recurrent training and refinement of the first and second image processing engines 418 and 420. Specifically, the first image processing engine 418 may be adapted to operate in two modes, namely a run-time mode and a refinement mode. While operating in the run-time mode, the first image processing engine 418 may be adapted to receive each video frame (Im) from the second video cameras 24 to identify and quantify the number of goods items 20 in the designated zone 22. While operating in the refinement mode, the first image processing engine 418 may be adapted to receive, from the second image processing engine 420, updates to the configuration variables of the first image processing engine 418. The first image processing engine 418 may be further adapted to implement each such update.

The second image processing engine 420 may also be adapted to receive each video frame (Im) from the second video cameras 24 and to use this together with the additional information (i.e. the authorised person's statement as to the number ($N_{stated}$) of goods items being delivered to the location) provided by the dialogue manager 410 to provide continuing assessment and improvement to the performance of the first image processing engine 418 and adaptation to changing environmental variables (e.g. lighting, goods items stacking patterns, presence of dirt or debris in the designated zone). The second image processing engine 420 may be adapted to do the above, by ongoing tuning of the configuration variables and provision to the first image processing engine 418 of the resulting updates to the configuration variables.

Figure 6:
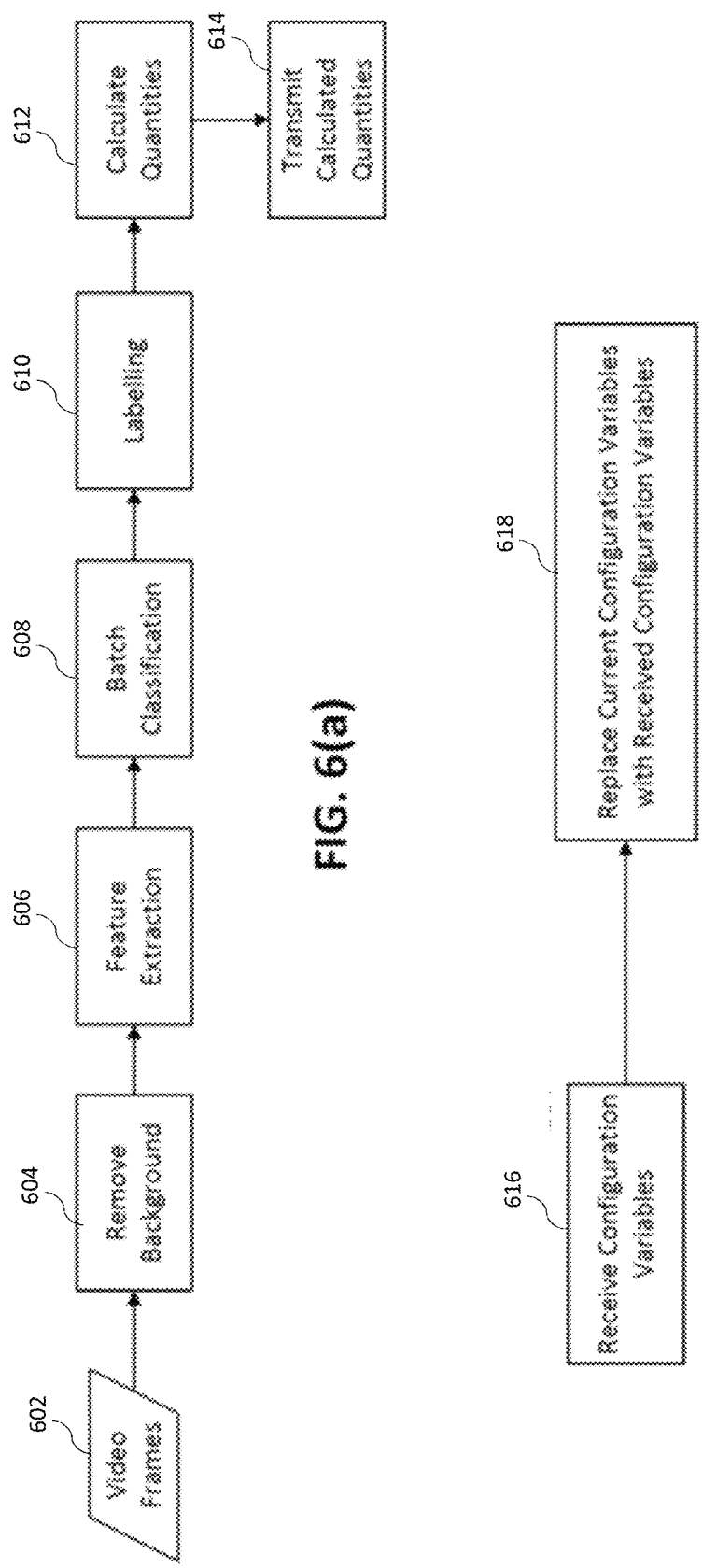
FIG. 6(a) illustrates a process flow for a run-time operational phase of a first image processing engine of the goods receipt management system of FIG. 3 in accordance with an embodiment of the present disclosure.
FIG. 6(b) illustrates a process flow for a refinement operational phase of a first image processing engine of the goods receipt management system of FIG. 3 in accordance with an embodiment of the present disclosure.

Referring to FIG. 6(a) together with FIG. 4, in the run-time operational mode, the first image processing engine 418 is adapted to receive each video frame (Im) at step 602, and to remove therefrom the background around and between goods items in the designated zone 22 at step 604. Specifically, the first image processing engine 418 may use one or more image segmentation algorithms including mask division (including Mask Region-Based Convolutional Neural Networks (mask R-CNN), threshold segmentation and the like, to remove the background from each video frame (Im) wherein the background may include regions between adjacent, spaced apart goods items 20. The skilled person will understand that the above image segmentation algorithms are provided as examples only. In particular, the skilled person will understand that the preferred embodiment is in no way limited to the use of these image segmentation algorithms. Instead, the preferred embodiment is operable with any algorithm capable of separating the goods items 20 from the background in a video frame of the designated zone 22. For brevity, a video frame from which the background has been removed will be referred to henceforth as "First Step Video Frame".

On removal of the background from the received video frames (Im), the first image processing engine 418 may be adapted to employ one or more feature detection algorithms at step 606 to extract one or more key features from each First Step Video Frame. The key features may comprise a number of colors, type of colors, distribution of colors, detected edges and detected corners in each First Step Video Frame. The feature detection algorithms may include the Scale Invariant Feature Transform (SIFT) algorithm, the Sobel transform, the level curve curvature algorithm, the maximally stable extremal regions (MSER) algorithm and the principal curvature-based region detector. The skilled person will understand that the above key features and feature detection algorithms are provided as examples only. In particular, the skilled person will understand that the preferred embodiment is in no way limited to the use of the above key features and feature detection algorithms. Instead, the preferred embodiment is operable with any key features or feature detection algorithm or both, capable of facilitating the classification of goods items in a video frame. For brevity, a video frame from which the key features have been extracted will be referred to henceforth as "Second Step Video Frame".

Using the extracted key features, the first image processing engine 418 may be adapted to use one or more object classification algorithms to determine at step 608, the batch classification of one or more groups of similar goods items appearing in the Second Step Video Frame. The process of determining the batch classification may include a localization step comprising the provision of bounding boxes around groups of similar goods items in the Second Step Video Frame. The object classification algorithms may include Region-Based Convolutional Neural Networks (R-CNN), You Only Look Once (YOLO) algorithms or the like. The skilled person will understand that the above object classification algorithms are provided as examples only. In particular, the skilled person will understand that the preferred embodiment is in no way limited to the use of these object classification algorithms. Instead, the preferred embodiment is operable with any object classification algorithm capable of determining the or each batch classification of one or more groups of similar goods items appearing in a video frame. For brevity, a video frame in which groups of similar goods items have been batch classified (and one or more bounding boxes may have been created enclosing each of the said groups) will be referred to henceforth as "Third Step Video Frame".

Using the batch classifications of each group of similar goods items (and optionally using the bounding box enclosing said group) appearing in the Third Step Video Frame, the first image processing engine 418 may be adapted to use a labelling algorithm at step 610 to label such goods items. The first image processing engine 418 may further be adapted to use a label counting algorithm at step 612 to calculate the number ($N_{Calc}$) of different goods items with matching labels appearing in the Third Step Video Frame. In this way, the first image processing engine 418 may be adapted to determine the number of different types of goods items placed by the authorised person in the designated zone 22.

Consequently, the first image processing engine 418 enables the goods receipt management system to maintain a record of the numbers of goods items of different types received at any given moment at the location. This in turn supports effective stock control and inventory management at the location. To support its ongoing improvement, at step 614, the first image processing engine 418 may be adapted to transmit to the second image processing engine 420 the calculated number ($N_{Calc}$) of different goods items with matching labels.

Figure 7:
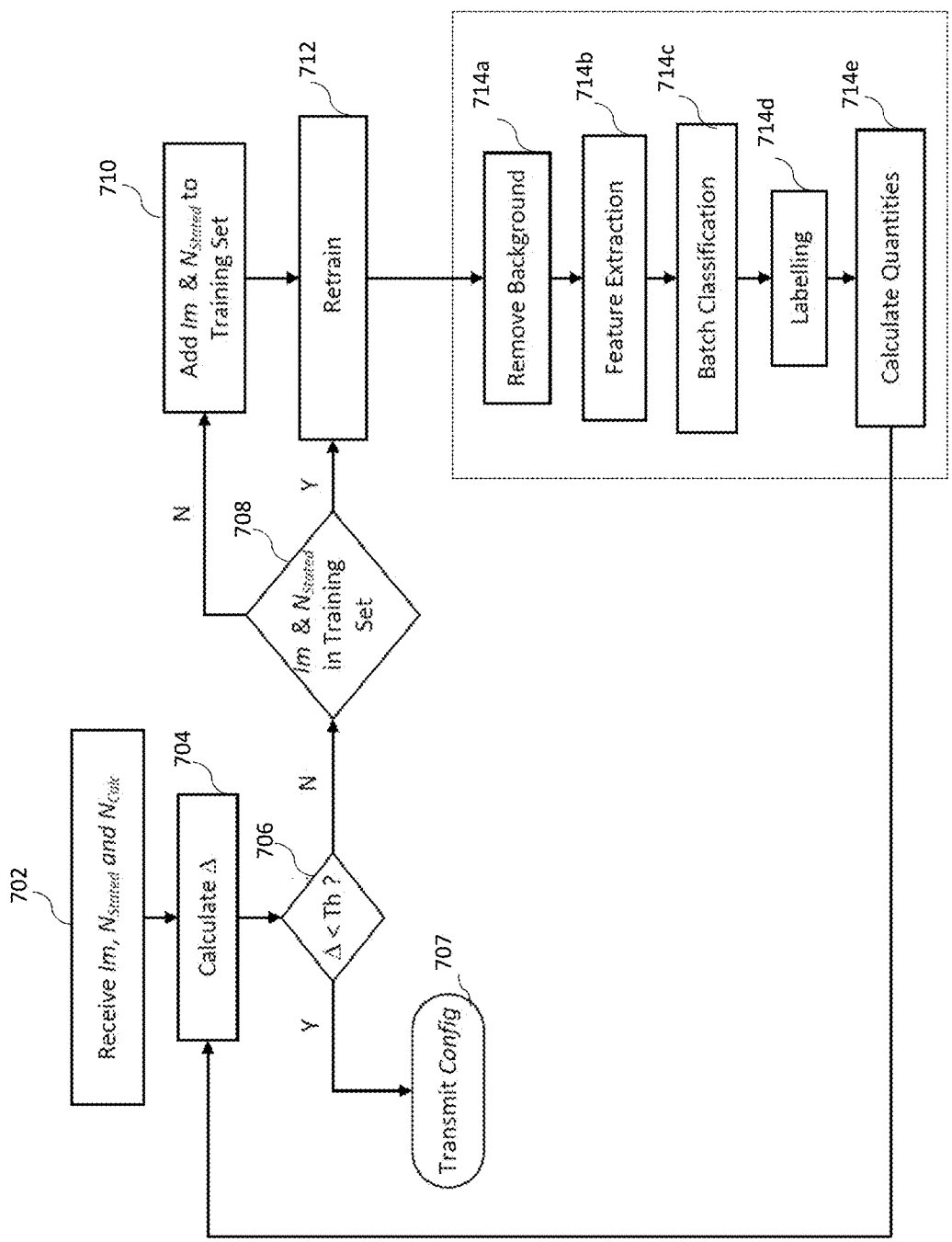
FIG. 7 illustrates a process flow for a second image processing engine of the goods receipt management system of FIG. 3, in accordance with an embodiment of the present disclosure.

Referring to FIG. 7 together with FIG. 4, at step 702, the second image processing engine 420 is adapted to receive video frames (Im) from the second video camera 24; the calculated number ($N_{Calc}$) of different types of goods items put by the authorised person in the designated zone 22 from the first image processing engine 418; and the authorised person's statement as to the number ($N_{stated}$) of goods items being delivered to the location from the dialogue manager 410.

At step 704, the second image processing engine 420 may be further adapted to calculate the difference (Δ) between the authorised person's statement as to the number of goods items being delivered to the location and the number of goods items calculated by the first image processing engine 418, using expression (1) below $$\Delta = |N_{Stated} - N_{Calc}| \quad (1)$$

The person skilled in the art will understand that the above expression is provided for example purposes only. In particular, the preferred embodiment is in no way limited to the above expression for calculating the difference. Instead, the preferred embodiment is operable with any expression suitable for assessing a difference between the authorised person's statement as to the number of goods items being delivered to the location and the number of goods items calculated by the first image processing engine 418, including for further example, a squared difference or a weighted difference expression.

At step 706, the second image processing engine 420 may be adapted to compare the difference (Δ) with a tolerance threshold value (Th) whose value may be preconfigured by the location operators. In the event the difference (Δ) is less than the tolerance threshold value (Th), then at step 707, the second image processing engine 420 is adapted to transmit its current configuration variables (Config) to the first image processing engine 418.

In the event the difference Δ is greater than or equal to the tolerance threshold value (Th), at step 708, the second image processing engine 420 may be adapted to check if the received video frames (Im) from the second video cameras 24 and the authorised person's stated number ($N_{stated}$) of delivered goods items are contained in the training set. In the event, the training set does not contain the received video frames (Im) and the authorised person's stated number ($N_{stated}$) of delivered goods items, the second image processing engine 420 may be adapted to add them to the training set at step 710.

Following the addition to the training set of the received video frames (Im) and the authorised person's stated number ($N_{stated}$) of delivered goods items, the second image processing engine 420 may be adapted to use the training set, at step 712, to re-train each model or each algorithm or both employed by the second image processing engine 420. In the process, the second image processing engine 420 effectively re-tunes its configuration variables.

The second image processing engine 420 may be adapted to reassess its performance with the re-tuned configuration variables using the received video frames (Im). To perform the reassessment, the second image processing engine 420 may be adapted to use the re-tuned configuration parameters to implement substantially the same processes as those implemented by the first image processing engine 418, namely:

- at step 714a, removing from each video frame (Im), the background around and between goods items in the designated zone 22;
- at step 714b, extracting one or more key features from the or each First Step Video Frame;
- at step 714c, determining the batch classification of one or more groups of similar goods items appearing in the Second Step Video Frame
- at step 714d, labelling the goods items appearing in the Third Step Video Frame; and at step 714e, calculating the number ($N^*_{Calc}$) of different goods items placed by the authorised person in the designated zone 22.

In an embodiment of the present disclosure, the second image processing engine 420 may further be adapted, at step 704, to calculate the difference (Δ) between the authorised person's statement as to the number of goods items being delivered to the location and the number of goods items calculated by the second image processing engine 420, using expression (2) below $$\Delta = |N_{Stated} - N^*_{Calc}| \qquad (2)$$

The person skilled in the art will understand that the above expression is provided for example purposes only. In particular, the preferred embodiment is in no way limited to the above expression for calculating the difference. Instead, the preferred embodiment is operable with any expression suitable for assessing a difference between the authorised person's statement as to the number of goods items being delivered to the location and the number of goods items calculated by the second image processing engine 420, including for further example, a squared difference or a weighted difference expression.

At step 706, the second image processing engine 420 may be adapted to compare the difference (Δ) with the tolerance threshold value (Th). In the event the difference (Δ) is less than a tolerance threshold value (Th), the second image processing engine 420 may be adapted, at step 708, to transmit its current configuration variables (Config) to the first image processing engine 418. But in the event, the difference (Δ) is greater than or equal to the tolerance threshold value (Th), the second image processing engine 420 may be adapted to further re-train each model or each algorithm or both employed by the second image processing engine 420.

In the event that after a pre-configured number of iterations of retraining each model or each algorithm or both employed by the second image processing engine 420, the difference (Δ) does not significantly improve with respect to the tolerance threshold value (Th), the authorised person's statement as to the number of goods items being delivered to the location is most likely to be incorrect. In this case, the second image processing engine 420 may be adapted to retain a record of the event, notify the location operators of the same, and request the authorised person to await the arrival of human investigators.

Referring to FIG. 6(b) the first image processing engine 418 may be adapted to receive the configuration variables (Config) from the second image processing engine 420 at step 616 and replace its current configuration variables at step 618 with those newly received. In this way, the models of the first image processing engine 418 are continually refreshed and improved as deliveries are made to the location.

Figure 8:
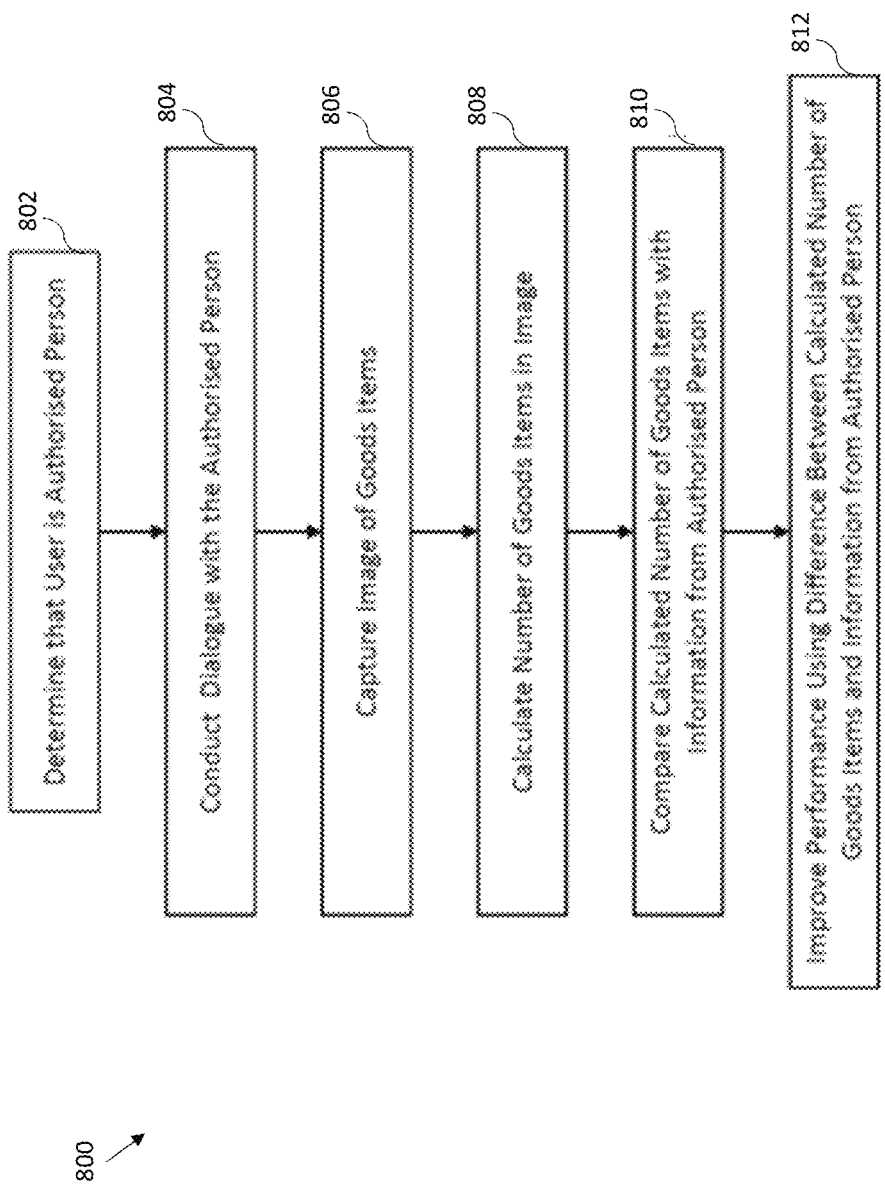
FIG. 8 is a flowchart illustrating a method for implementing the goods receipt management system of FIG. 3, in accordance with an embodiment of the present disclosure.

FIG. 8 illustrates a method 800 for operating a goods receipt management system, according to an implementation of the present disclosure. The order in which the method 800 is described is not intended to be construed as a limitation, and any number of the described method blocks can be combined in any appropriate order to carry out the method 800 or an alternative method. Additionally, individual blocks may be deleted from the method 800 without departing from the scope of the subject matter described herein.

The method 800 can be performed by programmed computing devices, for example, based on instructions retrieved from the non-transitory computer-readable medium or non-transitory computer-readable media. The computer-readable media can include machine-executable or computer-executable instructions to perform all or portions of the described method. The computer-readable media may be, for example, digital memories, magnetic storage media, such as magnetic disks and magnetic tapes, hard drives, or optically readable data storage media.

At step 802, the method 800 includes determining that a user is an authorised person. In an aspect, the determination is performed by using a face recognition algorithm to compute one or more facial details of the user from an image of the face of the user and to compare the computed facial details with previously stored facial details of authorised persons to find a match therewith.

At step 804, the method 800 includes conducting a dialogue with the authorised person to receive information from the authorised person regarding the number of goods items being delivered; and to direct the authorised person to place the goods items in the designated zone. In an aspect, the conducting comprises converting one or more preconfigured narrative components into synthetic speech, receiving and interpreting utterances from the authorised person, and responding thereto. In another aspect, the conducting comprises interrogating a manifest unit detailing expected deliveries at the location, to retrieve therefrom the relevant information.

At step 806, the method 800 includes capturing images of the goods items in the designated zone.

At step 808, the method 800 includes calculating the number of goods items in the designated from the images. In an aspect, the calculating comprises removing from the images, the background around and between goods items; extracting one or more key features from the resulting image; determining a batch classification of one or more groups of similar goods items appearing in the resulting image; labelling the goods items; and calculating the number of goods items with matching labels to calculate the number of different types of goods items placed by the authorised person in the designated zone.

At step 810, the method 800 includes comparing the calculated number of goods items with information received from the authorised person during the dialogue therewith.

At step 812, the method 800 includes using the difference between the calculated number of goods items with the information received from the authorised person to improve the performance of the method 800. In an aspect, the using comprises adding the image and the calculated number of goods items to a pre-configured training set of data; re-training with the training set, models used by the method; reassessing the performance of the method with the retrained models; and repeating the retraining and reassessing steps until a required level of performance is achieved.

The above description does not provide specific details of the manufacture or design of the various components. Those of skill in the art are familiar with such details, and unless departures from those techniques are set out, techniques, known, related art or later developed designs and materials should be employed. Those in the art can choose suitable manufacturing and design details.

Note that throughout the disclosure, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "authenticating," or "facilitating," or "executing," or "capturing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims

What is claimed is:

1. A goods receipt management system comprising:
   a non-transitory storage device having embodied therein one or more routines to manage the receipt of goods items at a location; and
   one or more processors coupled to the non-transitory storage device and operable to execute the one or more routines, wherein the one or more routines include:
   a face recognition engine, which when executed by the one or more processors, uses one or more facial features of a user to recognize the user as an authorised person;
   a dialogue manager engine, which when executed by the one or more processors, obtains from the authorised person, a stated number of goods items being delivered;
   a quantification engine, which when executed by the one or more processors, receives an image of the goods items and calculates the number of goods items appearing in the image;
   a comparison engine, which when executed by the one or more processors, compares the calculated number of goods items with the stated number of goods items, and in the event of a substantial match, records the calculated number of goods items; and
   a performance improvement engine, which when executed by the one or more processors, uses the image of the goods items to re-tune one or more configuration variables of the quantification engine, in the event of a mis-match between the calculated number of goods items and the stated number of goods items.

2. The system of claim 1, wherein the quantification engine is configured to:
   remove the background around and between goods items from the image; extract one or more key features from the image;
   determine a batch classification of one or more groups of similar goods items appearing in the image;
   label each goods item appearing in the image; and
   calculate the number of labels and number of goods items with matching labels appearing in the image.

3. The system of claim 1, wherein the performance improvement engine is configured to:
   add the image and the calculated number of goods items to a pre-configured training set of data;
   re-train one or more models used by the performance improvement engine with the training set;
   reassess the performance of the performance improvement engine with the retrained models;
   repeat the retraining and reassessment until a pre-defined level of performance is achieved; and
   replace the configuration variables of the quantification engine with those of the retrained models of the performance improvement engine.

4. The system of claim 3, wherein the performance improvement engine is configured to:
   remove from each image in the training set, the background around and between goods items;
   extract one or more key features from each image in the training set;
   determine a batch classification of one or more groups of similar goods items appearing in each image in the training set;
   label each goods item appearing in each image of the training set;
   calculate the number of labels and number of goods items with matching labels appearing in each image in the training set; and
   compare the calculated number of goods items with a corresponding number of goods items for each image contained in the training set.

5. The system of claim 1, wherein the dialogue manager engine is configured to:
convert one or more preconfigured narrative components into synthetic speech using a speech synthesis algorithm and play the speech to the authorised person;
receive and interpret utterances from the authorised person using a speech recognition algorithm; and
respond to the received utterances.

6. The system of claim 5, wherein the dialogue manager engine is configured to use a speech synthesis algorithm selected from the set of speech synthesis algorithms comprising concatenative speech synthesis algorithms, parametric speech synthesis algorithms and audio generative models based on Convolutional Neural Networks, Recurrent Neural Networks or both.

7. The system of claim 5, wherein the dialogue manager engine is configured to use a speech recognition algorithm selected from the set of speech recognition algorithms comprising Gaussian Mixture Model based Hidden Markov Models (GMM-HMM), K-Means Clustering, Expectation Maximisation [EM], Kernel Principal Component Analysis, Deep Belief Neural Networks (DBN), Recurrent Neural Networks and Time Delay Neural Networks (TDNN).

8. The system of claim 1, wherein the face recognition engine is configured to receive an image of the user and to use a face recognition algorithm to compute the one or more facial features of the user from the image; and compare each computed facial detail against one or more stored facial details of one or more authorised persons.

9. The system of claim 8, wherein the face recognition engine is configured to use a face recognition algorithm selected from the set of face recognition algorithms comprising Support Vector Machines, Principal Component Analysis/Kernel Principal Component Analysis, Independent Component Analysis, Hidden Markov Models, Convolutional Neural Networks and Generative Adversarial Networks.

10. The system of claim 8, wherein the face recognition engine is configured to use a face detection algorithm to detect the presence of a human face in the image prior to computing therefrom, the one or more facial features of the user.

11. The system of claim 10, wherein the face recognition engine is configured to use a face detection algorithm selected from the set of face detection algorithms comprising the Viola-Jones face detector, Speeded Up Robust Features (SURF) cascades, Support Vector Machines (SVM) and Convolutional Neural Networks.

12. A method for managing the receipt of goods at a location, comprising the steps of:
recognizing a user as an authorised person using one or more facial features of the user;
obtaining from the authorised person a stated number of goods items being delivered;
receiving an image of the goods items;
calculating the number of goods items appearing in the image;
comparing the calculated number of goods items with the stated number of goods items;
recording the calculated number of goods items in the event of a substantial match between the calculated number of goods items and the stated number of goods items; and
re-tuning one or more configuration variables of the method using the image of the goods items, in the event of a mis-match between the calculated number of goods items and the stated number of goods items.

13. The method of claim 12, wherein the step of calculating the number of goods items appearing in the image comprises the steps of:
removing from the image, the background around and between goods items;
extracting one or more key features from the image;
determining a batch classification of one or more groups of similar goods items appearing in the image;
labelling each goods item appearing in the image; and
calculating the number of labels and number of goods items with matching labels appearing in the image.

14. The method of claim 12, wherein the step of re-tuning one or more configuration variables comprises the steps of:
adding the image and the calculated number of goods items to a pre-configured training set of data;
re-training one or more models used by the method with the training set, to produce the re-tuned configuration variables;
reassessing the performance of the method with the retrained models;
repeating the retraining and reassessment until a predefined level of performance is achieved; and
replacing the configuration variables with the re-tuned configuration variables.

15. The method of claim 14, wherein the step of reassessing the performance of the method with the retrained models comprises the steps of:
removing from the image, the background around and between goods items;
extracting one or more key features from the image;
determining a batch classification of one or more groups of similar goods items appearing in the image;
labelling each goods item appearing in the image;
calculating the number of labels and number of goods items with matching labels appearing in the image; and
comparing the calculated number of goods items with the stated number of goods items.

16. The method of claim 12, wherein the step of obtaining a stated number of goods items being delivered from the authorised person, comprises the steps of:
converting one or more preconfigured narrative components into synthetic speech using a speech synthesis algorithm and playing the speech to the authorised person;
receiving and interpreting utterances from the authorised person using a speech recognition algorithm; and
responding to the received utterances.

17. The method of claim 16, wherein the step converting one or more preconfigured narrative components into synthetic speech and playing the speech to the authorised person comprises the step of using a speech synthesis algorithm selected from the set of speech synthesis algorithms comprising concatenative speech synthesis algorithms, parametric speech synthesis algorithms and audio generative models based on Convolutional Neural Networks, Recurrent Neural Networks or both.

18. The method of claim 16, wherein the step of receiving and interpreting utterances from the authorised person comprises the step of using a speech recognition algorithm selected from the set of speech recognition algorithms comprising Gaussian Mixture Model based Hidden Markov Models (GMM-HMM), K-Means Clustering, Expectation Maximisation [EM], Kernel Principal Component Analysis, Deep Belief Neural Networks (DBN), Recurrent Neural Networks and Time Delay Neural Networks (TDNN).

19. The method of claim 12, wherein the step of using one or more facial features of a user to recognize the user as an authorised person comprises the steps of:
  receiving an image of the user;
  using a face recognition algorithm to compute the one or more facial features of the user from the image; and
  comparing each computed facial detail against one or more stored facial details of one or more authorised persons.

20. A non-transitory computer readable medium configured to store a program causing a computer to manage the receipt of goods at a location, said program configured to:
  recognize a user as an authorised person by using one or more facial features of the user;
  obtain from the authorised person a stated number of goods items being delivered;
  receive an image of the goods items;
  calculate the number of goods items appearing in the image;
  compare the calculated number of goods items with the stated number of goods items;
  record the calculated number of goods items in the event of a substantial match between the calculated number of goods items and the stated number of goods items; and
  re-tune one or more configuration variables using the image of the goods items, in the event of a mis-match between the calculated number of goods items and the stated number of goods items.

* * * * *